(12) United States Patent
Hirama

(10) Patent No.: US 8,098,387 B2
(45) Date of Patent: Jan. 17, 2012

(54) IMAGE TRANSFERRING APPARATUS

(75) Inventor: Masayuki Hirama, Tokyo (JP)

(73) Assignee: Oki Data Corporation, Tokyo (JP)

( * ) Notice: Subject to any disclaimer, the term of this patent is extended or adjusted under 35 U.S.C. 154(b) by 1001 days.

(21) Appl. No.: 12/034,911

(22) Filed: Feb. 21, 2008

(65) Prior Publication Data

US 2008/0212124 A1    Sep. 4, 2008

(30) Foreign Application Priority Data

Feb. 21, 2007    (JP) ................................. 2007-041054

(51) Int. Cl.
*G06K 15/00* (2006.01)
(52) U.S. Cl. ........................ 358/1.14; 358/1.15; 358/405
(58) Field of Classification Search .................. 358/1.14, 358/1.15, 1.16, 405, 434, 437, 438, 468
See application file for complete search history.

(56) References Cited

U.S. PATENT DOCUMENTS

| | | | |
|---|---|---|---|
| 5,973,790 A | 10/1999 | Ichinowatari | |
| 6,226,097 B1 * | 5/2001 | Kimura | ........................ 358/1.14 |
| 6,862,114 B1 | 3/2005 | Hayashi | |
| 2003/0128402 A1 | 7/2003 | Tanimoto | |
| 2004/0075871 A1 | 4/2004 | Itoh | |
| 2005/0265066 A1 * | 12/2005 | Machiyama | .................. 365/145 |

FOREIGN PATENT DOCUMENTS

| | | |
|---|---|---|
| JP | 8-293989 A | 11/1996 |
| JP | 10-056547 A | 2/1998 |
| JP | 2000-287052 A | 10/2000 |
| JP | 2001-016252 A | 1/2001 |
| JP | 2001-111734 A | 4/2001 |
| JP | 2004-096798 A | 3/2004 |

\* cited by examiner

*Primary Examiner* — Thomas D Lee
(74) *Attorney, Agent, or Firm* — Panitch Schwarze Belisario & Nadel LLP

(57) ABSTRACT

An image transferring apparatus for transmitting image data to a file server has an image input unit allowing input of image as the image data, a memory section for storing the image data, and registration and transmission information of the image data, and a communication controller for transmitting the image data stored in the memory section to the file server. The communication controller has a judgment unit for making a judgment based on the registration and transmission information of the image data as to whether communication condition of the image data is normal or not. The communication controller transmits a request for deleting the image data to the file server in a case where the judgment is made that the communication condition is not normal during transmission of the image data stored in the memory section to the file server.

10 Claims, 7 Drawing Sheets

A) EXAMPLE OF A CASE WHERE THE IMAGE DATA IS SUCCESFULLY STORED IN THE FILE SERVER

B) EXAMPLE OF A CASE WHERE AN ERROR OCCUS DURING TRANSMISSION OF THE IMAGE DATA

IMAGE TRANSFERRING APPARATUS

BACKGROUND OF THE INVENTION

1. Field of the Invention

The present invention relates to an image transferring apparatus for transmitting image data.

2. Description of Related Art

Image transferring apparatuses have been known as represented as, e.g., MFPs (Multifunction Peripheral) that has a function to transfer image data of read documents to a file server on a network.

For example, Japanese Patent Application Publication No. 2000-287052, describes an image information transferring apparatus with functions that allows a user to avoid laborious handling of documents without deteriorating apparatus's use efficiency in a case where the user sends an image data again due to errors such as anomaly network traffics occur during reading of original documents or during transmission of the image data.

Many arts have been disclosed that ensure certainty and reliability in transmission and reception of the image data between the image transferring apparatus and receiving apparatuses such as file servers, but few inventions regard handling of incomplete image data caused by errors such as anomaly network traffics in addition to image data transmission and reception technology as described above.

Incomplete image data tend to be handled roughly in comparison with complete image data, and in some case, are neglected inadvertently as they are. Where the image data and the like include various types of information requiring due care of a high degree such as corporation's secrets and personal information, the image data must be handled particularly gingerly even though the image data is incomplete.

Where errors occur such as anomaly network traffics during reading of the original documents or during transmission of the image data on the side of image transferring apparatus, the incomplete image file received on the side of the file sever usually remains in a memory portion on the side of the file server unless intentionally deleted on the side of the file server, and may bring about risks of allowing information to be divulged to a malicious third party.

SUMMARY OF THE INVENTION

The present invention was invented in consideration of the above problems. An object of the present invention is to provide an image transferring apparatus which ensures reliable image data transmission and also ensures security of incomplete image data received by the file server even where a network traffic error and the like occurs.

According to one aspect of the invention, to solve the above problems, an image transferring apparatus for transmitting image data to a file server has an image input unit allowing input of image as the image data, a memory section for storing the image data, and registration and transmission information of the image data, and a communication controller for transmitting the image data stored in the memory section to the file server. The communication controller has a judgment unit for making a judgment based on the registration and transmission information of the image data as to whether communication condition of the image data is normal or not. The communication controller transmits a request for deleting the image data to the file server in the case where the judgment is made that the communication condition is not normal during transmission of the image data stored in the memory section to the file server.

The image transferring apparatus according to one aspect of the invention has an information input section for scanning an image as image data. The image transferring apparatus according to one aspect of the invention has a memory section for storing image data, and a registration information of a file name and transmission date and time information of the image data. The image transferring apparatus further has a communication controller for transmitting the image data to the file server.

The communication controller of the image transferring apparatus according to one aspect of the invention has a judgment section for making a judgment as to whether the image data is appropriately transmitted to the file server, based on a file name of the image data transmitted to the file server and date and time when the image data was transmitted.

Where the judgment section makes a judgment that an error such as a network traffic error or the like occurs during communication between the image transferring apparatus and the file server, the communication controller transmits a command for requesting deletion of the image data to the file server, so that the image data, which is stored in an incomplete condition in the file server, is to be deleted.

The image transferring apparatus according to one aspect of the invention ensures the image data transmission to the file server, thereby securing security of the incomplete image data received at the file server side in the event of an error such as a network traffic error.

BRIEF DESCRIPTION OF THE DRAWINGS

This invention may take physical form in certain parts and arrangements of parts, a preferred embodiment and method of which will be described in detail in this specification and illustrated in the accompanying drawings which form a part hereof, and wherein.

PREFERRED EMBODIMENTS

First Embodiment

Figure 1:
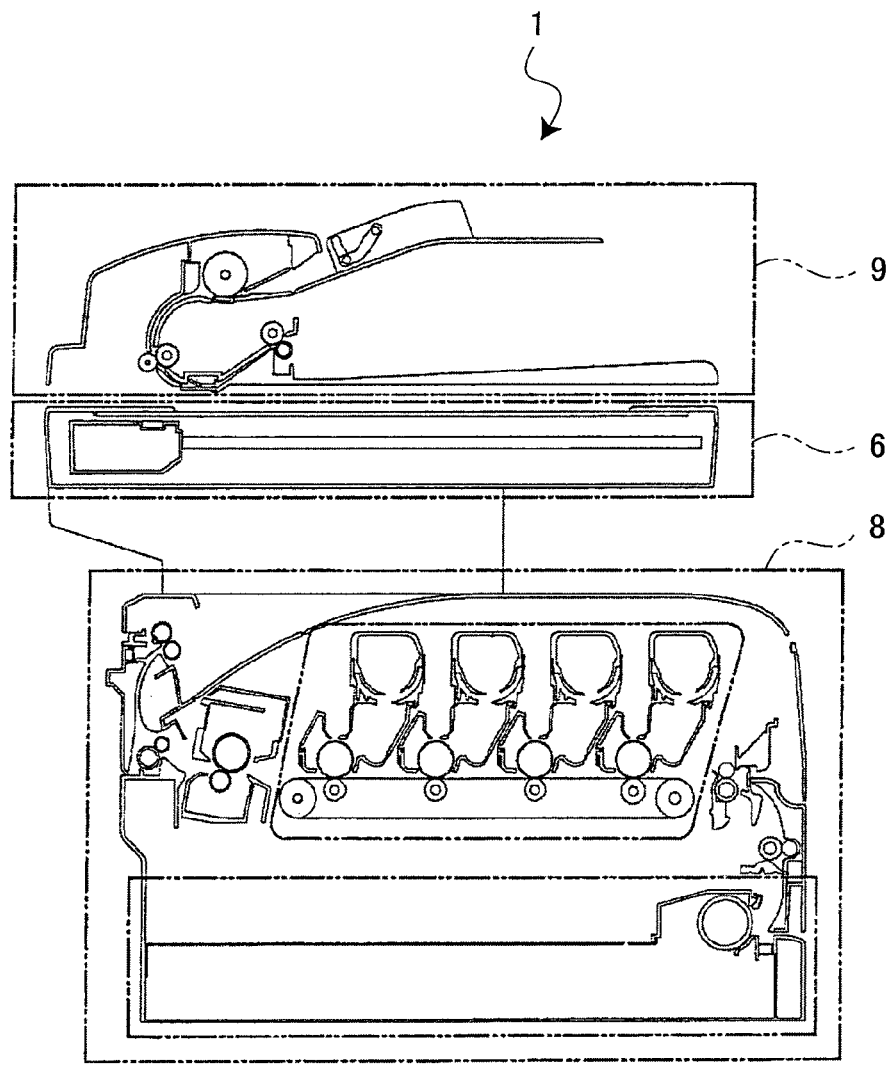
FIG. 1 is a cross-sectional view showing an example of configuration of an image transferring apparatus according to the invention.

An image transferring apparatus according to the first embodiment of the invention is described hereinafter with reference to FIGS. 1 to 3. FIG. 1 is a cross-sectional view showing an example of configuration of the image transferring apparatus according to the invention, and in this embodiment, an MFP is described. An MFP 1 has an image scanning section 6 as an image input unit, an image printing section 8, and a medium feeding section 9.

The image scanning section 6 includes a flat bed scanner having an image scanning sensor and scans an image to read the image.

The image printing section 8 includes an image forming unit composed of an image drum for forming images on paper and a transfer roller, and also includes a fuser unit for fusing on the paper the image formed with the image forming unit.

The medium feeding section 9 includes a feeding tray having a curved portion in the center of a medium stacking surface thereof, a pair of guiding units for positioning both widthwise ends of a medium, a feeding roller for separating media sheet by sheet and feeding the separated medium, and a discharging roller for discharging the medium whose image has been scanned to the discharge tray.

Figure 2:
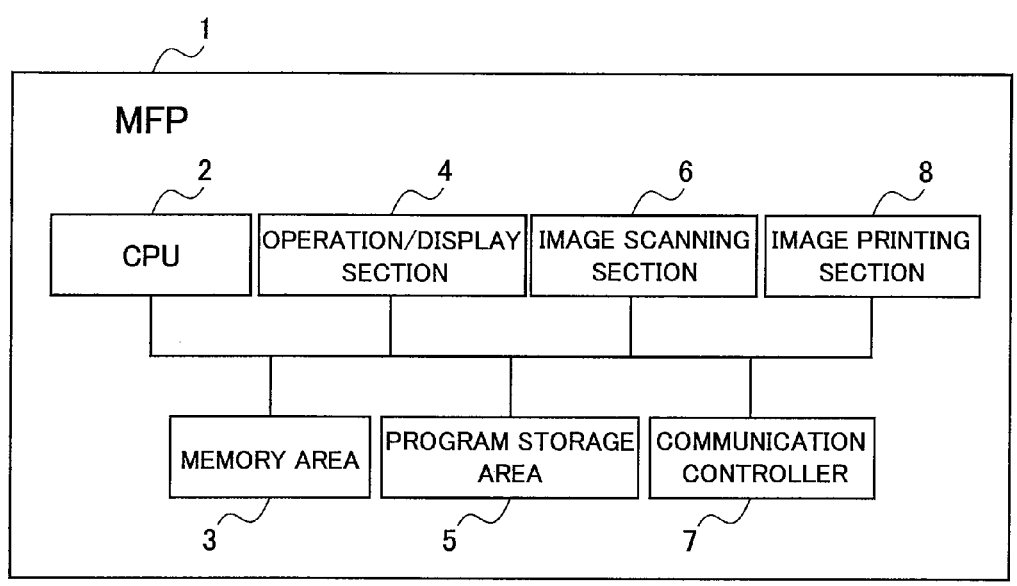
FIG. 2 is a block diagram of an MFP 1 according to the invention.

FIG. 2 is a block diagram of the MFP 1 according to the invention. The MFP 1 is composed of a CPU (Central Processing Unit) 2 for performing overall control of the apparatus, a memory area 3 composed of a RAM (Random Access Memory), a flash memory, and the like, an operation/display section 4 such as an operation panel or an LCD (Liquid Crystal Display), a program storage area 5 composed of a ROM (Read Only Memory), a flash memory, and the like, the image scanning section 6, a communication controller 7, and an image printing section 8.

The CPU 2 is composed of a microprocessor or the like and performs overall control of the MFP 1 by executing a program (firmware) stored in the program storage area 5.

The memory area 3 is composed of a RAM, a flash memory, and the like, as described above, and stores various types of configuration information while temporarily storing information necessary for program execution.

The operation/display section 4 receives manipulation of information input operation and displays an apparatus status during operations, various configuration information, and the like.

The program storage area 5 is composed of a nonvolatile memory such as the ROM and the flash memory as described above, and stores a program necessary for overall control of the MFP 1.

The communication controller 7 performs a series of operations to establish connection with, for example, network, USB (Universal Serial Bus), and the like.

The image printing section 8 prints image data onto a recording medium or the like. The medium feeding section 9 automatically feeds a document, which a user intends to scan, to the image scanning section 6.

Figure 3:
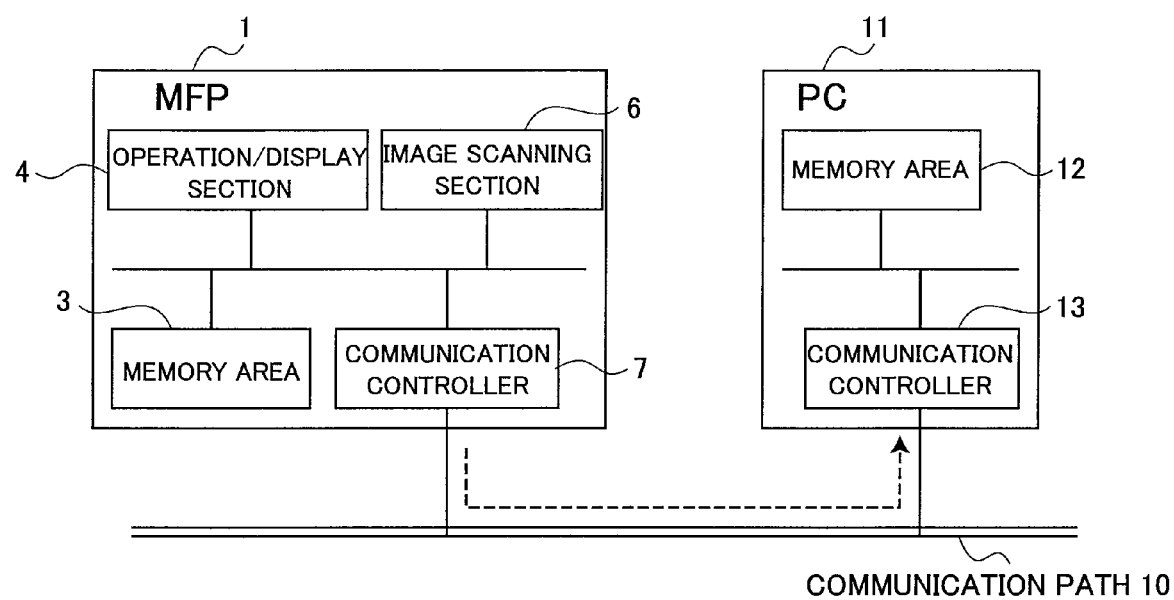
FIG. 3 is a connection diagram of an image transfer system according to the invention.

FIG. 3 is a connection diagram of an image transfer system according to the invention. FIG. 3 shows only elements related to image transmission and reception.

In this embodiment, a PC (Personal Computer) 11 receives the image data from the MFP 1. The PC 11 includes a communication control unit 13 for executing a series of operations for establishing connection between the PC 11 and a communication path 10 such as network, USB and the like, and a memory area 12 for storing the image information. It is herein assumed that the PC 11 is a file server computer, such as NAS (Network Attached Storage) and the like, used with connection to a network.

Initial configuration of the PC 11 is done with input devices such as keyboard and mouse and with a display for displaying configuration screen. But if the PC 11 works as a normal file server computer, those external input devices are not connected.

It is also possible that the PC 11 is controlled by another PC using a Web browser or the like. In that case, only a person such as an administrator, who has authority to change configurations, changes the configurations. The PC 11 shall not be operated unless authentication information such as a user name and a password is supplied.

Figure 4:
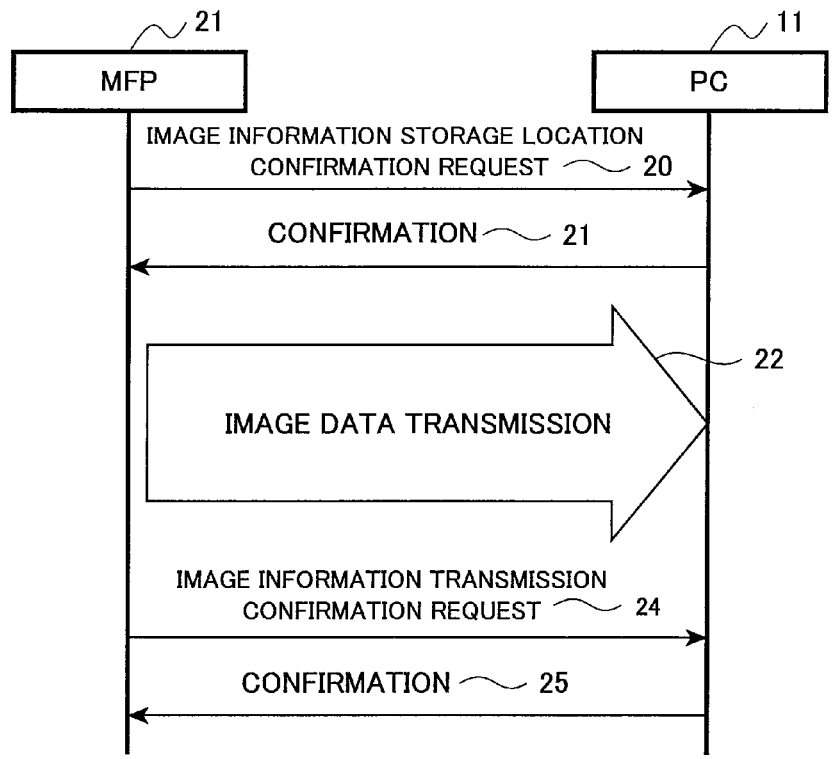
FIG. 4A is a sequence diagram illustrating a transfer procedure conducted between the MFP 1 and a PC 11 according to the first embodiment of the invention.
FIG. 4B is a sequence diagram illustrating a transfer procedure conducted between the MFP 1 and the PC 11 according to the first embodiment of the invention.
Figure 4:
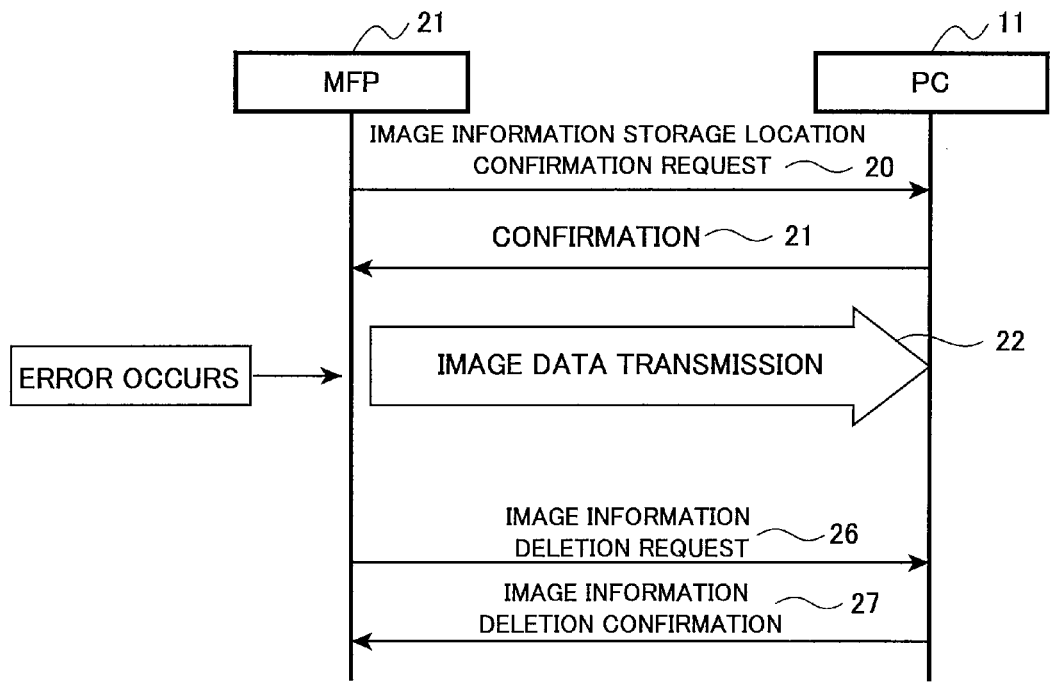
Figure 5:
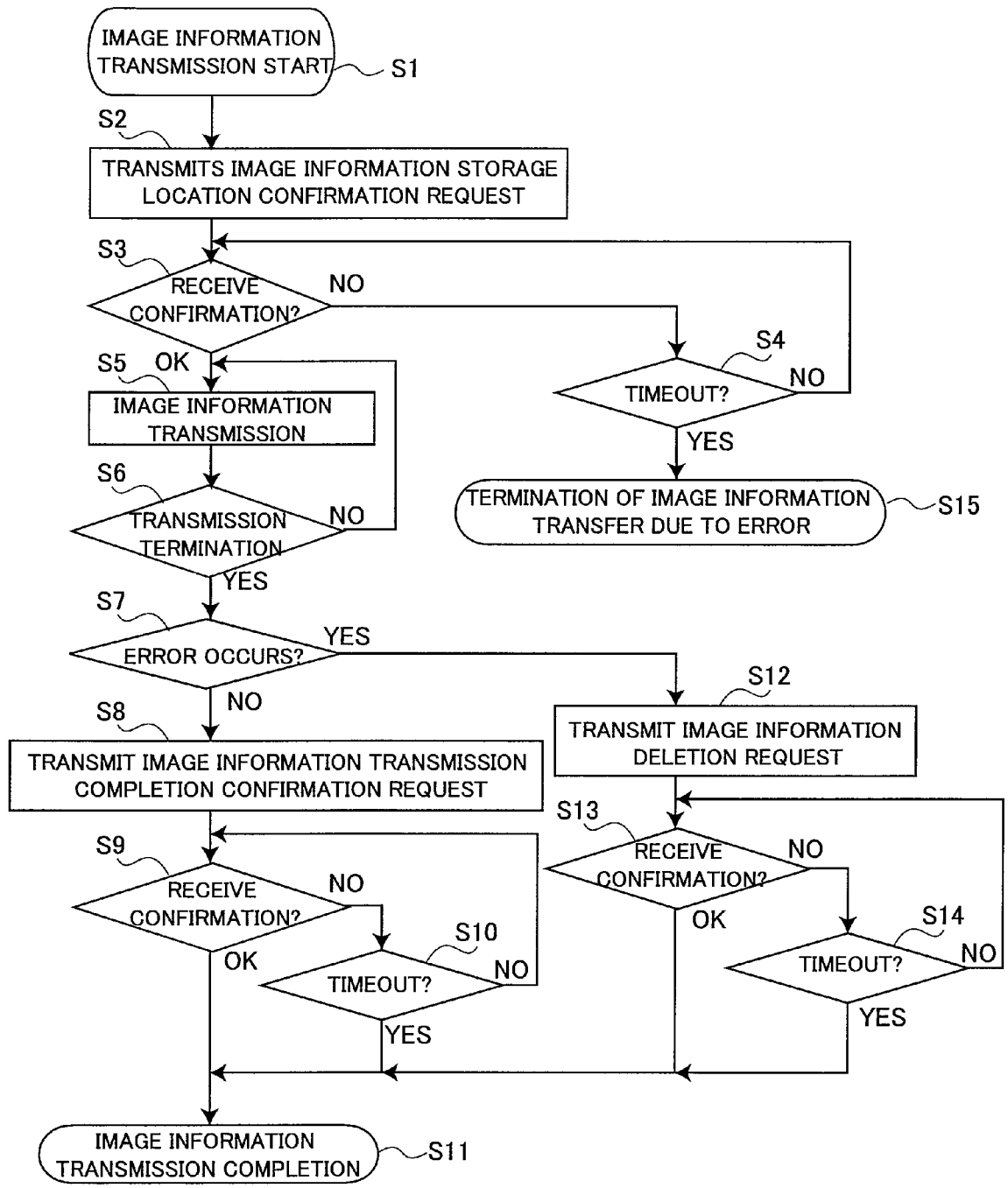
FIG. 5 is a flow chart illustrating a sequence of a general operation of the MFP according to the first embodiment of the invention.

Operation of the apparatus according to the first embodiment will be hereinafter described with reference to FIGS. 4A, 4B, and 5. Each of FIGS. 4A and 4B is a sequence diagram describing a transfer procedure between the MFP 1 and the PC 11. FIG. 5 is a flow chart describing a series of operations of the MFP 1. FIG. 4A is a diagram describing a transfer procedure where the image data is normally stored in the file server. FIG. 4B is a diagram describing a transfer procedure where transfer of the image data is terminated due to an error occurred during the transfer.

The transfer procedures of FIGS. 4A, 4B are the same until completion of transfer of the image data, and accordingly, it is assumed in the below explanation that a confirming command 20 and a confirmation 21 in FIGS. 4A, 4B and procedures up to step S7 in FIG. 5 are common.

First, the user sets the document or the image to be scanned on the image scanning section 6 of the MFP 1 and configures a destination of transmission of the image data with the operation/display section 4, and then, the MFP 1 goes into an image information transmission starting state at step S1 in FIG. 5.

When the user enters an image transfer starting instruction with the operation/display section 4, the communication controller 7 transmits an image information storage location confirmation request command to an apparatus specified as the destination of transmission (i.e., the PC 11 in case of the first embodiment) through the communication path 10 at step S2 in FIG. 5 and step 20 in FIGS. 4A, 4B.

The communication controller 7 of the MFP 1 and the communication controller 13 of the PC 11 communicates with each other via FTP (File Transfer Protocol). Specifically, the MFP 1 transmits open command to the PC 11 to try to communicate with the PC 11 at step S1.

Thereafter, the MFP 1 waits for a reply from the PC 11 at step S3 in FIG. 5. Where the communication controller 7 of the MFP 1 does not receive any response from the communication controller 13 of the PC 11 for a certain period of time after trying to connect to the PC 11 ("NO" at step S3 in FIG. 5), the communication controller 7 determines timeout ("YES" at step S4 in FIG. 5), and assumes that the image information transfer is terminated due to error, thus terminating a connection procedure with the PC 11 (step S15 in FIG. 5).

Where the image information transfer is terminated due to error, the communication controller 7 of the MFP 1 displays to this effect on the operation/display section 4. The configuration of a timeout period for waiting for the response from the PC 11 can be changed with the operation/display section 4.

Where the communication controller 7 of the MFP 1 receives within the timeout period a confirmation from the communication controller 13 of the PC 11 ("OK" at step S3 in FIG. 5 and the confirmation 21 in FIGS. 4A and 4B), the communication controller 7 of the MFP 1 continues to transmit the image data to the PC 11 with put or mput command (step S5 in FIG. 5 and the image data transmission 22 in FIGS. 4A and 4B) until the transmission of the image data terminates (step S6 in FIG. 5).

When the transmission of the image data terminates ("YES" at step S6 in FIG. 5), the communication controller 7 of the MFP 1 then makes a judgment as to whether the termination of the transmission results from completion of the image data transmission or from an error such as a network traffic error or an error due to storage capacity shortage of the PC 11 (step S7 in FIG. 5).

The communication controller 7 of the MFP 1 transmits a get command to the communication controller 13 of the PC 11 to retrieve a registration information file of the image data stored in the PC 11 or transmits a dir command to obtain a registration list of the image data.

Then, the communication controller 7 of the MFP 1 determines whether the transmission of the image data has been successfully completed by comparing the registration and transmission information of the image data in the MFP 1 and a registration situation of the image data retrieved from the PC 11. That is, the communication controller 7 of the MFP 1 determines whether the transmission of the image data has been successfully completed by comparing a file containing the image data stored in the MFP 1 and a file containing the image data transmitted and now stored in the PC 11 with respect to file information thereof such as a filename, a file size, a hash value, a timestamp, and the like.

Where the communication controller 7 of the MFP 1 determines that the transmission is terminated due to occurrence of an error ("YES" at step S7 in FIG. 5), the communication controller 7 transmits an image information deletion request, that is, a delete command, to the communication controller 13 of the PC 11 (step S12 in FIG. 5 and the deletion request 26 in FIG. 4B).

The PC 11 executes the image information deletion, and the communication controller 7 of the MFP 1 waits for a response from the PC 11 (step S13 in FIG. 5). Even where the communication controller 7 of the MFP 1 does not receive the response from the communication controller 13 of the PC 11 ("NO" at step S13 in FIG. 5) and the timeout period passes ("YES" at step S14 in FIG. 5), the communication controller 7 of the MFP 1 assumes that the image information transmission has been completed (step S11 in FIG. 5) and displays to that effect on the operation/display section 4. The timeout period for waiting for the response from the PC 11 can be configured with the operation/display section 4.

Where the communication controller 7 of the MFP 1 receives the response from the communication controller 13 of the PC 11 ("YES" at step S13 in FIG. 5 and the deletion confirmation 27 in FIG. 4B), the communication controller 7 of the MFP 1 also assumes that the image information transmission has been completed (step S11 in FIG. 5).

On the other hand, where the communication controller 7 of the MFP 1 determines that the termination of the transmission does not result from an error ("NO" at step S7 in FIG. 5), the communication controller 7 of the MFP 1 transmits an image information transmission completion confirmation request (step S8 in FIG. 5 and the request 24 in FIG. 4A).

The communication controller 7 of the MFP 1 waits for a response to the image information transmission completion confirmation request from the PC 11 for a certain period of time (step S9 in FIG. 5).

Where the communication controller 7 of the MFP 1 does not receive the response from the communication controller 13 of the PC 11 ("NO" at step S9 in FIG. 5) and the timeout period passes, the communication controller 7 of the MFP 1 assumes that the image information transmission has been completed ("YES" at step S10 in FIG. 5), and displays that no response is received from the PC 11 on the operation/display section 4. The timeout period for waiting for the response from the PC 11 can be configured with the operation/display section 4.

Where the communication controller 7 of the MFP 1 receives within the timeout period a confirmation responding to the image information transmission completion confirmation request ("OK" at step S9 in FIG. 5 and the confirmation 25 in FIG. 4A), the communication controller 7 of the MFP 1 assumes that the image information transmission has been completed (step S11 in FIG. 5), and determines that the memory area 12 of the PC 11 does not store the incomplete image data transferred this time, then displaying to that effect on the operation/display section 4 and terminating the image information transfer process.

As described above, the first embodiment prevents the incomplete image data from being accumulated in the file server even where a network traffic error or a storage capacity shortage error in the file server occurs while transmitting the image data from the image transferring apparatus to the file server.

Second Embodiment

The structure of the second embodiment is the same as the first embodiment and is thus omitted. Operation of the second embodiment is hereinafter described with reference to FIGS. 6 and 7.

Figure 6:
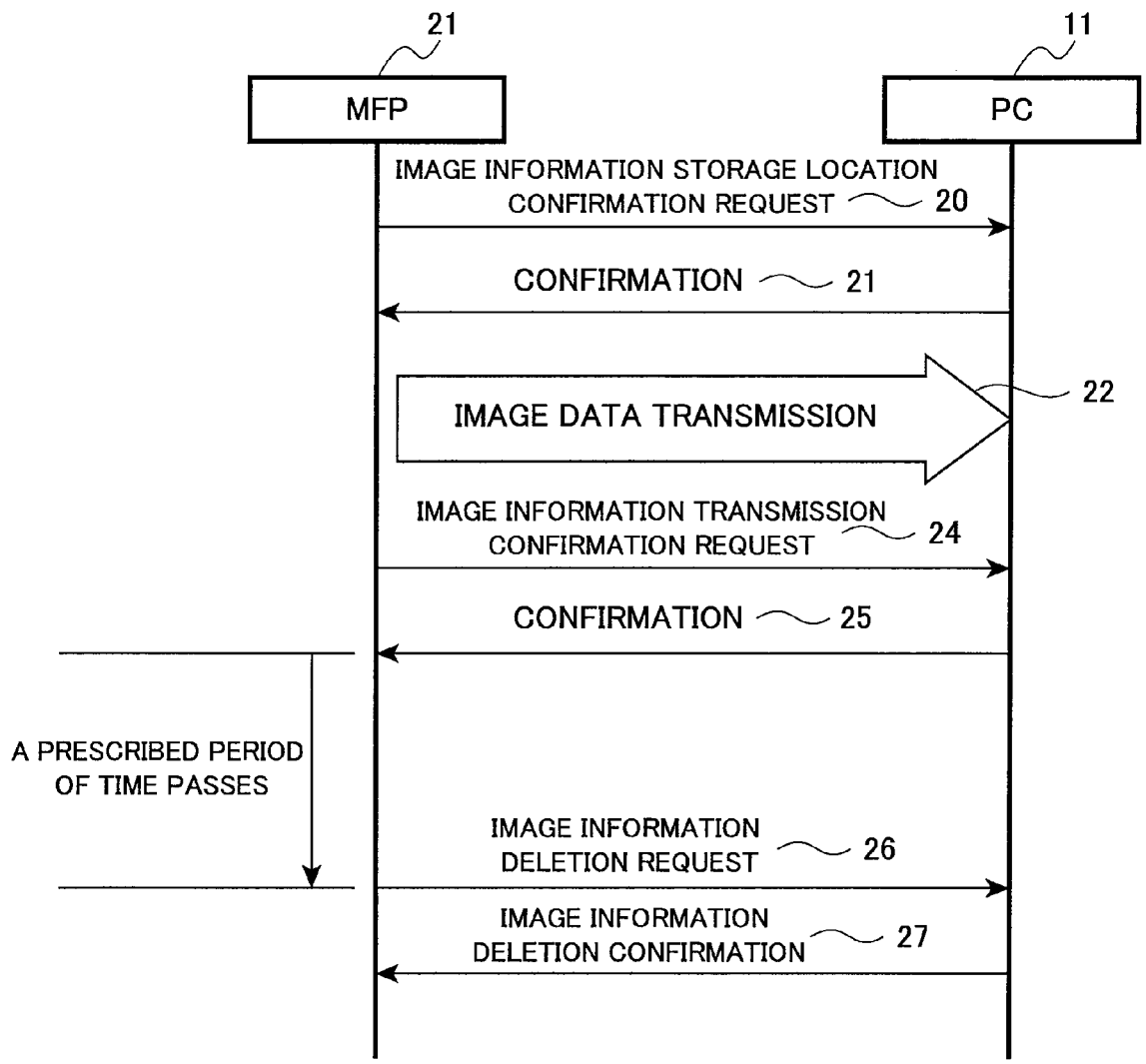
FIG. 6 is a sequence diagram illustrating a transfer procedure conducted between the MFP 1 and the PC 11 according to the second embodiment of the invention.
Figure 7:
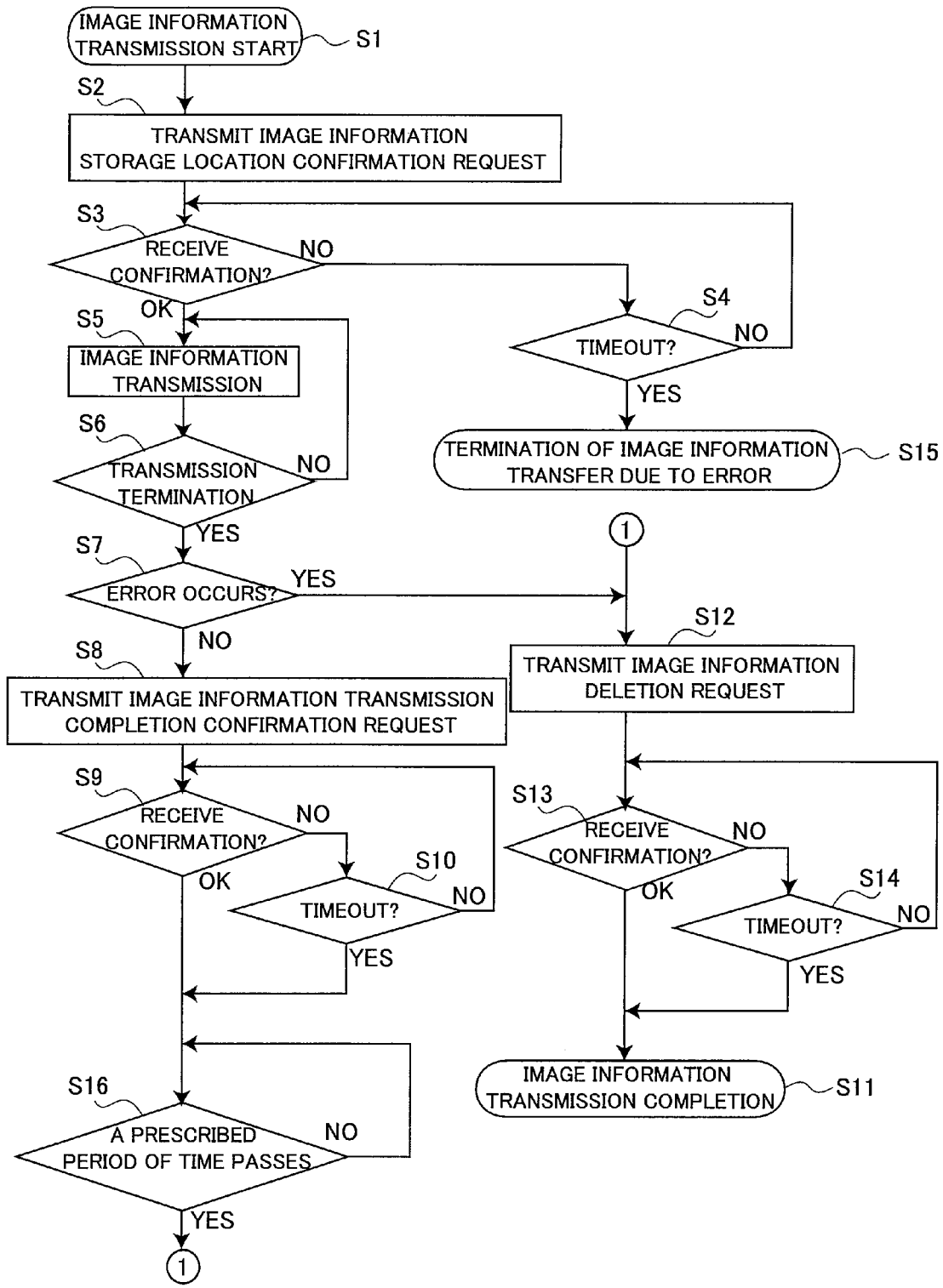
FIG. 7 is a flow chart illustrating a sequence of a general operation of the MFP according to the second embodiment of the invention.

FIG. 6 is a sequence diagram describing a transfer procedure between a MFP 21 and the PC 11. FIG. 7 is a flow chart describing a series of operation of the MFP 21.

The second embodiment is different from the first embodiment with respect to operations after the image data has been completely transmitted from the MFP 21 to the PC 11, and accordingly, the description about portions that are the same as the first embodiment is omitted, and only operation steps after the transfer of the image data is hereinafter described.

Where the communication controller 7 of the MFP 21 determines that the termination of the transmission does not result from an error ("NO" at step S7 in FIG. 7), the communication controller 7 of the MFP 21 transmits the image data information transmission completion confirmation request (step S8 in FIG. 7 and the transmission completion 24 in FIG. 6).

The communication controller 7 of the MFP 21 waits for the response to the image data information transmission completion confirmation request from the PC 11 for the prescribed period of time (step S9 in FIG. 7).

Where the communication controller 7 of the MFP 1 does not receive the response from the communication controller of the PC 11 ("NO" at step S9 in FIG. 7) and the timeout period passes ("YES" at step S10 in FIG. 7), the communication controller 7 of the MFP 1 assumes that the transmission completion confirmation has been received as a response to the image data information transmission completion confirmation request ("YES" at step S10 in FIG. 10), but displays that no response is received from the PC 11 on the operation/display section 4. The timeout period for waiting for the response from the PC 11 can be configured with the operation/display section 4.

Where the communication controller 7 of the MFP 1 receives within the timeout period a confirmation responding to the image information transmission completion confirmation request ("OK" at step S9 in FIG. 7 and the confirmation 25 in FIG. 6), the communication controller 7 of the MFP 1, the communication controller 7 of the MFP 1 goes into a standby mode for a period of time previously configured by the user with the operation/display section 4 (step S16 in FIG. 7).

The above predetermined period can be arbitrarily configured by the user. For example, the MFP 21 can transmit the image information deletion request to the PC 11 in a few days after the time and date of the transmission of the image data.

When the predetermined period passes ("YES" at step S16 in FIG. 7), the communication controller 7 of the MFP 21 then transmits the image information deletion request, that is, the delete command to the communication controller 13 of the PC 11 (step S12 in FIG. 7 and deletion request 26 in FIG. 6).

The PC 11 executes the image information deletion, and the communication controller 7 of the MFP 21 waits for the response to the image information deletion request (step S13 in FIG. 7). Even where the communication controller 7 of the MFP 21 does not receive the response from the communication controller 13 of the PC 11 ("NO" at step S13 in FIG. 7) and the timeout period passes ("YES" at step S14 in FIG. 7), the communication controller 7 of the MFP 21 assumes that the image information transmission has been completed (step S11 in FIG. 7) and displays to that effect on the operation/display section 4. The timeout period for waiting for the response from the PC 11 can be configured with the operation/display section 4.

Where the communication controller 7 of the MFP 1 receives within the timeout period the deletion confirmation responding to the image information deletion request from the communication controller 13 of the PC 11 ("OK" at step S13 in FIG. 7 and the deletion confirmation 27 in FIG. 6), the communication controller 7 of the MFP 21 determines that the memory area 12 of the PC 11 does not store the image data transferred this time and displays to that effect on the operation/display section 4.

As described above, the apparatus of the second embodiment prevents the unnecessary image data from being left in the file server even where a network traffic error or a storage capacity shortage error in the file server occurs during the image data transmission from the image transferring apparatus to the file server. Furthermore, the apparatus of the second embodiment deletes the image data stored in the file server when a certain period of time passes after completion of the image data transmission, thus improving security of the image data.

In this embodiment, FTP is employed as a communication protocol between the image transferring apparatus and the file server, but various communication protocols other than the FTP, such as TFTP (Trivial File Transfer Protocol), HTTP (Hypertext Transfer Protocol), NFS (Network File System), WebDAV (Distributed Authoring and Versioning protocol for the WWW), and SMB (Server Message Block) may be employed.

In the embodiments, the MFP is exemplified as the image transferring apparatus, but this invention can be applied to an apparatus having a function for inputting and transmitting image information, such as a facsimile, a scanner, and a photocopier.

Each embodiment is a preferred embodiment of this invention but this invention is not limited thereto. Each structure of the invention can be arbitrarily modified without departing from the scope of the invention.

The foregoing description of preferred embodiments of the invention has been presented for purposes of illustration and description, and is not intended to be exhaustive or to limit the invention to the precise form disclosed. The description was selected to best explain the principles of the invention and their practical application to enable others skilled in the art to best utilize the invention in various embodiments and various modifications as are suited to the particular use contemplated. It is intended that the scope of the invention should not be limited by the specification, but be defined by the claims set forth below.

What is claimed is:

1. An image transferring apparatus for transmitting image data to a file server, comprising:
    an image input unit allowing input of image as the image data;
    a memory section for storing the image data, registration information of the image data, and transmission information of the image data; and
    a communication controller for transmitting the image data stored in said memory section to said file server, wherein:
    said communication controller has a judgment unit for making a judgment based on the registration information and the transmission information as to whether communication condition of the image data is normal or not; and
    said communication controller transmits a request for deleting the image data to said file server where said judgment is made that said communication condition is not normal during transmission of the image data stored in said memory section to said file server.

2. The image transferring apparatus according to claim 1, wherein the registration information is a file name of the image data.

3. The image transferring apparatus according to claim 1, wherein the registration information is a file size of the image data.

4. The image transferring apparatus according to claim 1, wherein the registration information is a hash value of the image data.

5. The image transferring apparatus according to claim 1, wherein the registration information is a time stamp of the image data.

6. An image transferring apparatus for transmitting image data to a file server, comprising:
    an image input unit allowing input of image as the image data;
    a memory section for storing the image data, registration information of the image data, and transmission information of the image data; and
    a communication controller for transmitting the image data stored in said memory section to said file server, wherein:
    said communication controller has a judgment unit for making a judgment based on the registration information and the transmission information as to whether communication condition of the image data is normal or not; and
    said communication controller transmits a request for deleting the image data stored in said file server to said file server after a predetermined period passes from completion of transmission of the image data to said file server.

7. The image transferring apparatus according to claim 6, wherein the registration information is a file name of the image data.

8. The image transferring apparatus according to claim 6, wherein the registration information is a file size of the image data.

9. The image transferring apparatus according to claim 6, wherein the registration information is a hash value of the image data.

10. The image transferring apparatus according to claim 6, wherein the registration information is a timestamp of the image data.

* * * * *